US012375870B2

(12) United States Patent
Sun et al.

(10) Patent No.: US 12,375,870 B2
(45) Date of Patent: Jul. 29, 2025

(54) METHOD AND SYSTEM OF AUDIO SIGNAL PROCESSING FOR IN-VEHICLE VIRTUAL MULTICHANNEL SOUND, AND ELECTRONIC DEVICE

(71) Applicant: AAC ACOUSTIC TECHNOLOGIES (SHENZHEN) CO., LTD., Shenzhen (CN)

(72) Inventors: Shuyuan Sun, Shenzhen (CN); Yiming Meng, Shenzhen (CN); Hao Yin, Shenzhen (CN); Xin Zhang, Shenzhen (CN)

(73) Assignee: AAC ACOUSTIC TECHNOLOGIES (SHENZHEN) CO., LTD., Shenzhen (CN)

(*) Notice: Subject to any disclaimer, the term of this patent is extended or adjusted under 35 U.S.C. 154(b) by 285 days.

(21) Appl. No.: 18/327,007

(22) Filed: May 31, 2023

(65) Prior Publication Data

US 2024/0214766 A1 Jun. 27, 2024

Related U.S. Application Data

(63) Continuation of application No. PCT/CN2023/072774, filed on Jan. 18, 2023.

(30) Foreign Application Priority Data

Dec. 21, 2022 (CN) ......................... 202211660200.0

(51) Int. Cl.
*H04S 7/00* (2006.01)
*H04S 3/00* (2006.01)

(52) U.S. Cl.
CPC .............. *H04S 7/307* (2013.01); *H04S 3/008* (2013.01); *H04R 2499/13* (2013.01); *H04S 2400/01* (2013.01); *H04S 2400/13* (2013.01)

(58) Field of Classification Search
CPC ...... H04S 7/307; H04S 3/008; H04S 2400/01; H04S 2400/13; H04R 2499/13
See application file for complete search history.

(56) References Cited

U.S. PATENT DOCUMENTS

| | | | | | |
|---|---|---|---|---|---|
| 11,658,631 | B1 * | 5/2023 | Lim | H04S 7/307 | 375/345 |
| 2006/0280316 | A1 * | 12/2006 | Prince | H04S 7/307 | 381/86 |
| 2013/0163784 | A1 * | 6/2013 | Tracey | H04R 3/04 | 381/103 |

FOREIGN PATENT DOCUMENTS

| | | | |
|---|---|---|---|
| EP | 2605549 A1 * | 6/2013 | H03G 5/00 |

* cited by examiner

*Primary Examiner* — David L Ton
(74) *Attorney, Agent, or Firm* — Wiersch Law Group

(57) ABSTRACT

Disclosed are a method and a system of audio signal processing for in-vehicle virtual multichannel sound, and an electronic device. The method includes: obtaining an audio input signal in a single audio channel; identifying different frequency components in the audio input signal; assigning audio data in different frequency bands of the audio input signal to different signal paths according to the different frequency components; performing a digital signal processing on the audio data from different signal paths to obtain a plurality of single-channel signals in different frequency bands; and combining the plurality of single-channel signals into a single-channel audio output signal and outputting it. The present application not only realizes individual digital signal processing of different frequency bands for multiple speakers connected in parallel to a single audio channel, to improve the sound quality of the whole vehicle, but also reduces the cost of the whole vehicle.

10 Claims, 5 Drawing Sheets

METHOD AND SYSTEM OF AUDIO SIGNAL PROCESSING FOR IN-VEHICLE VIRTUAL MULTICHANNEL SOUND, AND ELECTRONIC DEVICE

TECHNICAL FIELD

The present application relates to the field of automotive technology, in particular to a method and system of audio signal processing for in-vehicle virtual multichannel sound, and an electronic device.

BACKGROUND

With the rapid development of smart automotive technology, the audio system plays an essential role as a part of the vehicle entertainment system, and provides passengers with an immersive sound experience. Theoretically, the quality of an in-vehicle audio system would be better with more speakers in an in-vehicle audio system and output channels in an audio power amplifier. The ideal vehicle audio structure would be to have each speaker independently controlled by a dedicated audio power amplifier channel.

However, in practical applications, to reduce costs, the number of speakers in a vehicle is often greater than the number of output channels of the audio power amplifier. As a result, multiple different speakers are often connected in parallel to a single output channel of an audio power amplifier, and only the same type of digital signal processing can be applied to all different speakers connected in parallel to an audio power amplifier, thereby compromising the overall audio quality of the whole vehicle.

Therefore, it is necessary to provide a method and system for audio signal processing of in-vehicle virtual multichannel sound, and an electronic device, to address the above-mentioned technical problem.

SUMMARY

An objective of the present application is to provide a method and system of audio signal processing of in-vehicle virtual multichannel sound, and an electronic device, to address the problem that a plurality of different speakers on the output channel of an automobile single audio power amplifier in the related art can only perform the same digital signal processing, thus leading to the reduction of the sound quality of the whole vehicle.

In a first aspect, the present application provides a method of audio signal processing for in-vehicle virtual multichannel sound, comprising:

- obtaining an audio input signal in a single audio channel;
- identifying different frequency components in the audio input signal;
- assigning audio data in different frequency bands of the audio input signal to different signal paths according to the different frequency components;
- performing a digital signal processing on the audio data from different signal paths corresponding to different frequency bands to obtain a plurality of single-channel signals in different frequency bands; and
- combining the plurality of single-channel signals into a single-channel audio output signal and outputting the single-channel audio output signal.

In one embodiment, the audio input signal is an analog signal or a digital signal.

In one embodiment, the frequency components of the audio input signal comprise a low-frequency band component, a medium-frequency band component, and a high-frequency band component.

In one embodiment, the step of identifying the frequency components in the audio input signal is preceded by the step of:

- preprocessing the audio input signal, wherein the preprocessing comprises a digital-to-analog conversion processing, an audio signal format conversion processing, a codec processing, an upsampling processing, and a downsampling processing for the audio input signal.

In one embodiment, the digital signal processing is a linear processing or a non-linear processing.

In one embodiment, the digital signal processing comprises a phase processing, an amplitude processing, and a delay processing for the audio data.

In one embodiment, the digital signal processing further comprises a recursive filter, a non-recursive filter, and a non-linear filter applied to the audio data.

In one embodiment, the audio output signal has the same frequency components as the audio input signal.

In a second aspect, the present application provides a system of audio signal processing for in-vehicle virtual multichannel sound, comprising:

- an input processing module, configured to obtain an audio input signal in a single audio channel, identify different frequency components in the audio input signal, and assign audio data in different frequency bands of the audio input signal to different signal paths according to the different frequency components;
- a digital signal processing module, configured to perform digital signal processing on the audio data from different signal paths corresponding to different frequency bands to obtain a plurality of single-channel signals in different frequency bands;
- an output processing module, configured to combine the plurality of single-channel signals into a single-channel audio output signal and outputting the single-channel audio output signal; and
- a power management module, configured to supply power to the input processing module, the digital signal processing module, and the output processing module.

In a third aspect, the present application provides an electronic device, comprising a memory, a processor, and a computing program stored on the memory and runnable on the processor, wherein the processor executes the computing program to implement steps in the above-mentioned method of audio signal processing for in-vehicle virtual multichannel sound.

Compared to the related art, in the method of audio signal processing for in-vehicle virtual multichannel sound in the present application, different frequency components of the audio input signal in the single audio channel are identified, then the audio data in different frequency bands of the audio input signal are assigned to different signal paths according to the different frequency components, then a digital signal processing is performed on the audio data from different signal paths corresponding to different frequency bands to obtain a plurality of single-channel signals in different frequency bands, and finally the plurality of single-channel signals are combined into a single-channel audio output signal and the single-channel audio output signal is outputted. Therefore, it not only realizes the individual digital signal processing of different frequency bands for multiple speakers connected in parallel to a single audio channel, to improve the sound quality of the whole vehicle, but also reduces the cost of the whole vehicle.

BRIEF DESCRIPTION OF THE DRAWINGS

In order to illustrate technical solutions of embodiments of the present application more clearly, the accompanying drawings required in the embodiments will be briefly introduced below. Obviously, the accompanying drawings in the following description are only some embodiments of the present application. For those of ordinary skill in the art, other accompanying drawings may also be obtained from these accompanying drawings without creative effort.

DETAILED DESCRIPTION OF THE EMBODIMENTS

The technical solutions in embodiments of the present application will be clearly and comprehensively described below. Obviously, the described embodiments are only a part of rather than all of the embodiments of the present application. Based on the embodiments of the present application, all other embodiments obtained by those of ordinary skill in the art without making creative labor fall within the protection scope of the present application.

Embodiment 1

Figure 1:
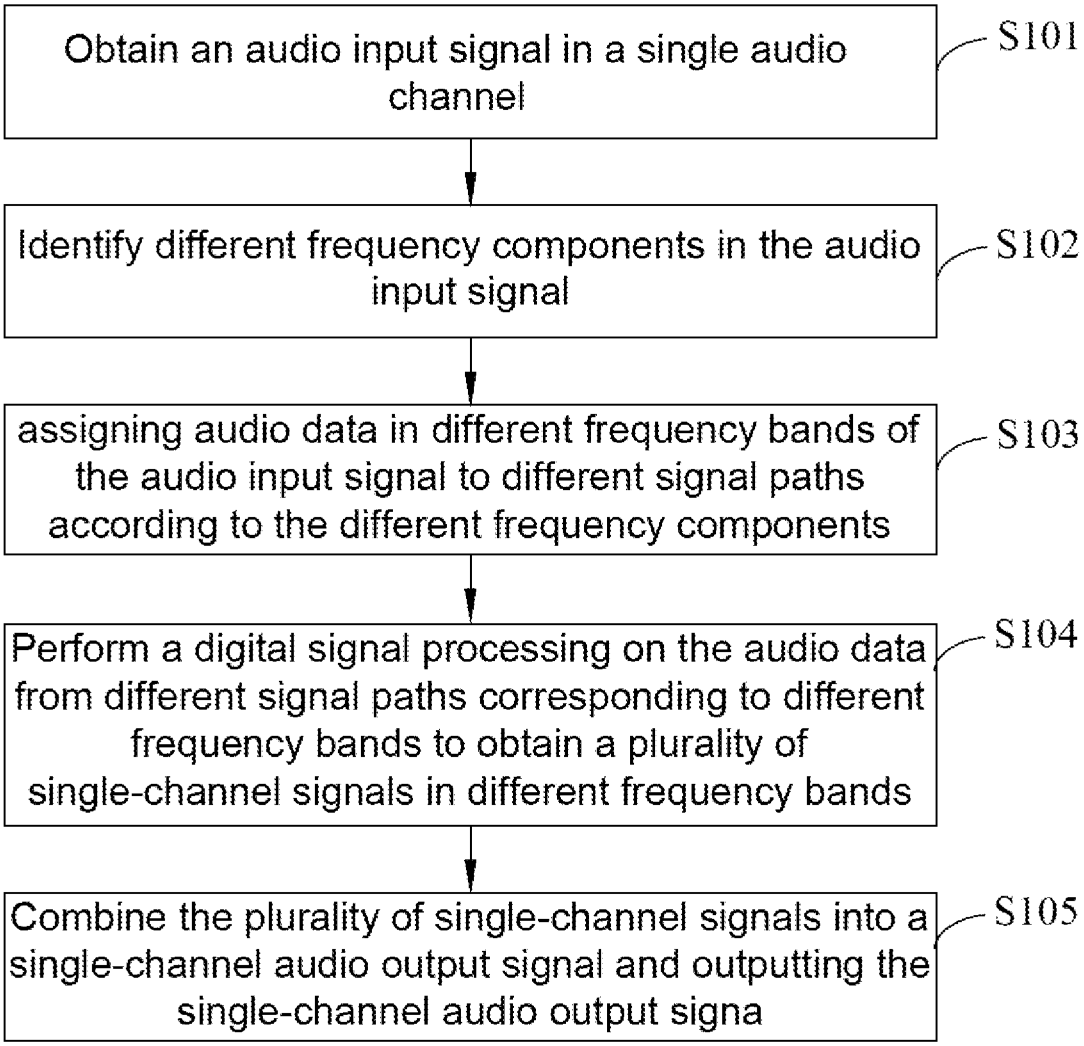
FIG. 1 is a flowchart of a method of audio signal processing for in-vehicle virtual multichannel sound according to Embodiment 1 of the present application.

Embodiments of the present application provide a method of audio signal processing for in-vehicle virtual multichannel sound, as shown in FIG. 1, including the following steps.

S101: an audio input signal in a single audio channel is obtained.

The audio input signal is an analog signal or a digital signal, which includes but is not limited to an ultra-low frequency signal, a low frequency signal, a medium frequency signal, and a high frequency signal.

The audio input signal is a single audio signal or a mono signal, obtained from an in-vehicle audio bus.

S102: different frequency components in the audio input signal are identified.

The different frequency components include a low-frequency band component, a medium-frequency band component, and a high-frequency band component in the audio input signal.

In this embodiment, before proceeding to step S102, the method further includes the following steps.

A preprocessing is performed on the audio input signal. The preprocessing includes a digital-to-analog conversion processing, an audio signal format conversion processing, a codec processing, an upsampling processing, and a downsampling processing of the audio input signal.

S103: audio data in different frequency bands of the audio input signal is assigned to different signal paths according to the different frequency components.

S104: a digital signal processing is performed on the audio data from different signal paths corresponding to different frequency bands to obtain a plurality of single-channel signals in different frequency bands.

The digital signal processing is linear or non-linear, which includes but is not limited to a phase processing, an amplitude processing, and a delay processing of the audio data, and further includes but is not limited to a recursive filter, a non-recursive filter, and a non-linear filter applied to the audio data. The phase processing, amplitude processing, and delay processing are adjustments of phase, amplitude, and delay, respectively.

S105: a plurality of the single-channel signals are combined into a single-channel audio output signal and the single-channel audio output signal output.

The audio output signal has the same frequency component as the audio input signal.

When the audio data after digital signal processing in different the signal paths are combined, the method includes but is not limited to a digital-to-analog conversion processing and a power amplification processing.

The processing method ensures that the final audio output signal remains a single audio signal or mono signal for playback through a single audio channel.

Figure 2:
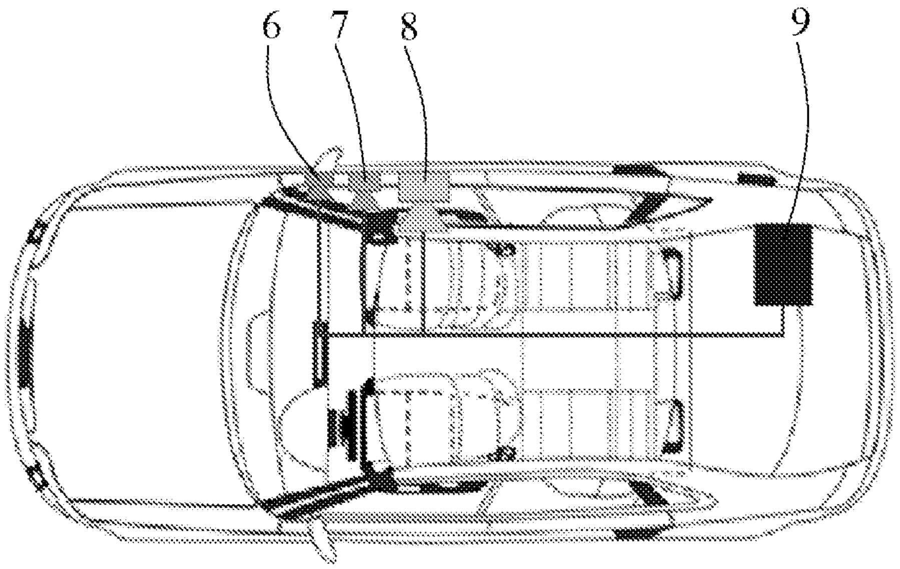
FIG. 2 is a diagram of an in-vehicle multi-speaker system according to Embodiment 1 of the present application.

Different speakers form a multi-speaker system, in this embodiment, as shown in FIG. 2. The multi-speaker system has three different types of speakers, respectively a high-frequency unit 6, a medium-frequency unit 7, and a low-frequency unit 8 mounted on the vehicle door, the high-frequency unit 6, the medium-frequency unit 7 and the low-frequency unit 8 are connected in parallel to the same output channel (single audio channel) of an audio amplifier 9 for output. With this architecture, the high-frequency unit 6, the medium-frequency unit 7, and the low-frequency unit 8 can only use the same digital signal processing parameters, which cannot simultaneously meet the best sound processing requirements of the high-frequency unit 6, the medium-frequency unit 7 and the low-frequency unit 8, resulting in poor sound quality of the whole vehicle, i.e., poorer acoustic performance or poorer sound effect.

Figure 3:
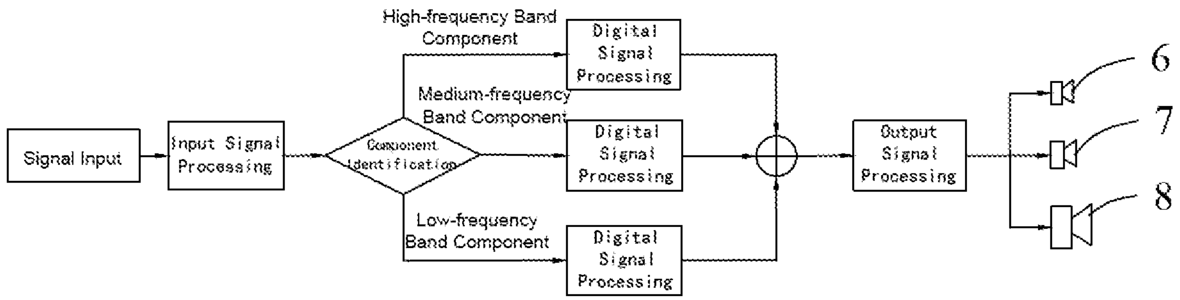
FIG. 3 is a diagram illustrating a simple process of the method of audio signal processing for in-vehicle virtual multichannel sound according to Embodiment 1 of the present application.

As shown in FIG. 3, the specific processing method of this embodiment is as follows.

Figure 4:
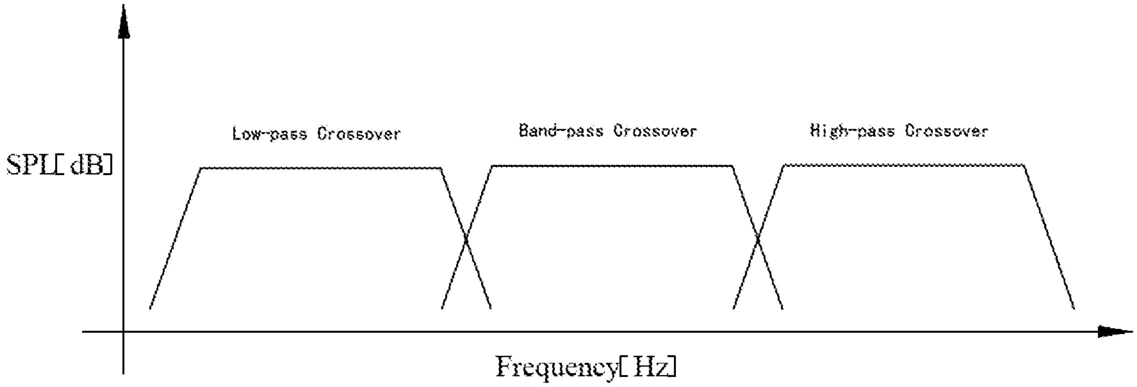
FIG. 4 is a diagram of an amplitude-frequency response curve of a three-band digital crossover according to Embodiment 1 of the present application.

Firstly, the audio input signal is obtained from the vehicle audio bus, and then the obtained audio input signal is pre-processed. Then, the components of the pre-processed audio input signal are identified, i.e., the high-frequency band component, the medium-frequency band component, and the low-frequency band component of the audio input signal are identified through a three-band digital crossover, and a schematic diagram of the amplitude frequency response curve of the three-band digital crossover is shown in FIG. 4.

After identifying the different frequency components in the audio input signal, the signals (audio data) of the different frequency components are assigned to different signal paths for digital signal processing corresponding to frequency bands.

After the signals processing of different frequency components is completed, then the processed signals of all frequency components are combined into the same signal (audio output signal), so that the audio output signal can be output for playback through a single audio channel.

Compared to the related art, in the method of audio signal processing for in-vehicle virtual multichannel sound in the present application, different frequency components of the audio input signal in the single audio channel are identified, then the audio data in different frequency bands of the audio input signal are assigned to different signal paths according to the different frequency components, then digital signal processing is performed on the audio data from different signal paths corresponding to different frequency bands to obtain a plurality of single-channel signals in different frequency bands, and finally the plurality of single-channel signals are combined into a single-channel audio output signal and the single-channel audio output signal is outputted. Therefore, it not only realizes individual digital signal processing of different frequency bands for multiple speakers connected in parallel to a single audio channel, to improve the sound quality of the whole vehicle, but also reduces the cost of the whole vehicle.

Embodiment 2

Figure 5:
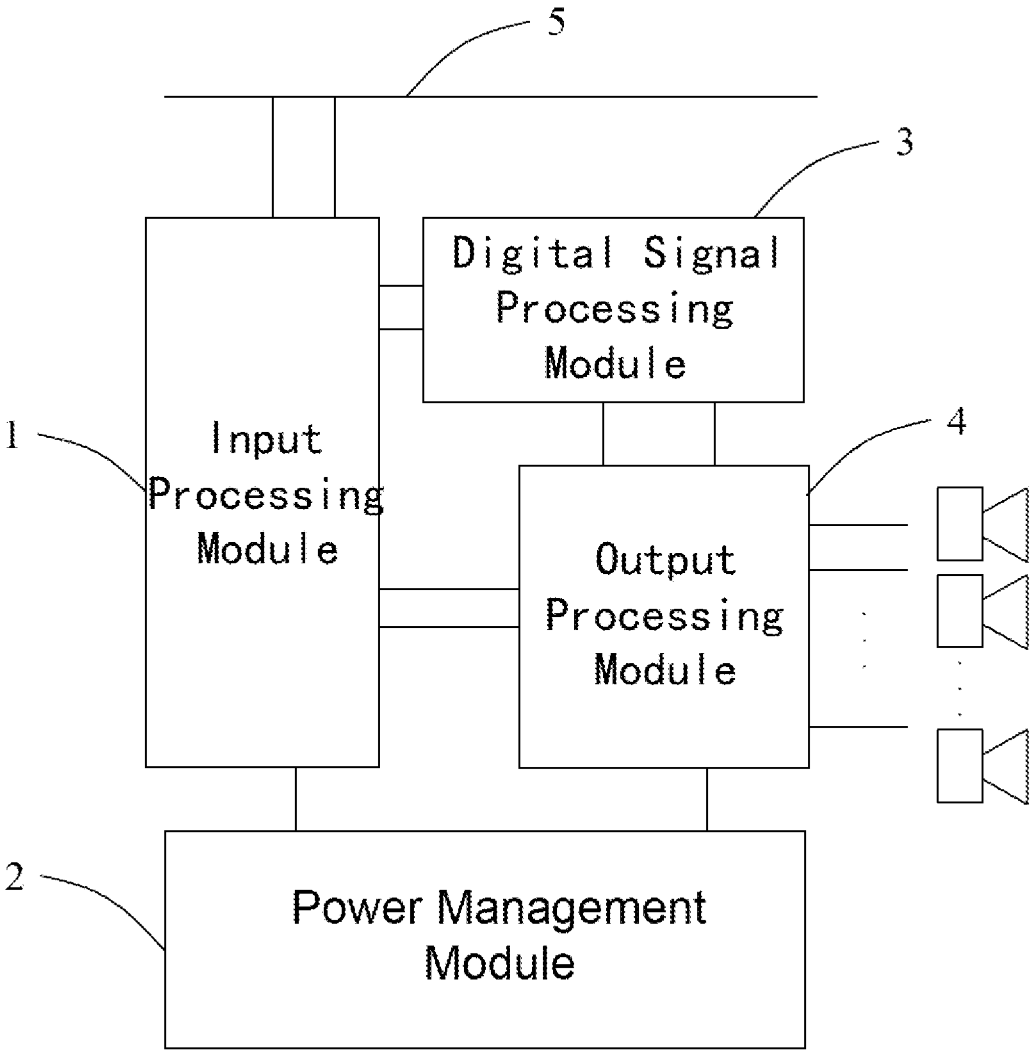
FIG. 5 is a diagram illustrating a framework of a system of audio signal processing for in-vehicle virtual multichannel sound according to Embodiment 2 of the present application.

Embodiments of the present application provide a system of audio signal processing for in-vehicle virtual multichannel sound, as shown in FIG. 5, including an input processing module 1, a digital signal processing module 3, an output processing module 4, and a power management module 2.

The input processing module 1 is configured to obtain an audio input signal in a single audio channel, identify different frequency components in the audio input signal, and assign audio data in different frequency bands of the audio input signal to different signal paths according to the different frequency components.

The input processing module 1 is electrically connected to an in-vehicle audio bus 5 to obtain the audio input signal of the single audio channel.

The digital signal processing module 3 is configured to perform digital signal processing on the audio data from different signal paths corresponding to different frequency bands to obtain a plurality of single-channel signals in different frequency bands.

The digital signal processing module 3 is electrically connected to the input processing module 1 to obtain audio data in the input processing module 1 in different signal paths.

The output processing module 4 is configured to combine the plurality of single-channel signals into a single-channel audio output signal and output the single-channel audio output signal.

The output processing module 4 is electrically connected to the input processing module 1 and the digital signal processing module 3, respectively, to obtain the audio signal after processing by the digital signal processing module 3.

The output processing module 4 is further electrically connected to the audio units (including but not limited to the high-frequency unit, the medium-frequency unit and the low-frequency unit) of the single audio channel in the above-mentioned multi-speaker system, to output the combined audio output signal to each audio unit for playback through the single frequency channel.

The power management module 2 is configured to supply power to the input processing module, the digital signal processing module, and the output processing module.

The power management module 2 is connected to the input processing module 1 and the output processing module 4, and is indirectly electrically connected to the digital signal processing module 3.

In this embodiment: the input processing module 1 is configured to implement steps S101 to S103 in Embodiment 1 above. The digital signal processing module 3 is configured to implement step S104 in Embodiment 1 above. The output processing module 4 is configured to implement step S105 in Embodiment 1 above. The power management module 2 is further configured to manage the power supply for the audio amplifier, which provides power to the input processing module 1, the digital signal processing module 3, and the output processing module 4 while also managing the power supply for these modules.

Since the system of audio signal processing for in-vehicle virtual multichannel sound in this embodiment can achieve the method of audio signal processing for in-vehicle virtual multichannel sound in Embodiment 1 above, it can also achieve the technical effect achieved by the method of audio signal processing for in-vehicle virtual multichannel sound in Embodiment 1 above, which will not be repeated herein.

Embodiments 3

Embodiments of the present application provide an electronic device, including a memory, a processor, and a computing program stored in the memory and runnable on the processor. The processor executes the computing program to achieve the steps in the method of audio signal processing for in-vehicle virtual multichannel sound as described above.

Since the electronic device in this embodiment can realize the method of audio signal processing for in-vehicle virtual multichannel sound in Embodiment 1 above, it can also achieve the method of audio signal processing for in-vehicle virtual multichannel sound in Embodiment 1 above, which will not be repeated herein.

Described above are only embodiments of the present application, but do not limit the scope of the patent of the present application. Any equivalent structure or equivalent process transformation made by using the specification of the present application and the accompanying drawings, or directly or indirectly applied in other related technical fields, are included in the protection scope of the patent of the present application in the same way.

What is claimed is:

1. A method of audio signal processing for in-vehicle virtual multichannel sound, comprising:

obtaining an audio input signal in a single audio channel;

identifying different frequency components in the audio input signal;

assigning audio data in different frequency bands of the audio input signal to different signal paths according to the different frequency components;

performing a digital signal processing on the audio data from different signal paths corresponding to different frequency bands to obtain a plurality of single-channel signals in different frequency bands; and combining the plurality of single-channel signals into a single-channel audio output signal and outputting the single-channel audio output signal.

2. The method of claim 1, wherein the audio input signal is an analog signal or a digital signal.

3. The method of claim 2, wherein the frequency components of the audio input signal comprise a low-frequency band component, a medium-frequency band component, and a high-frequency band component.

4. The method of claim 1, wherein the step of identifying the frequency components in the audio input signal is preceded by the step of:

preprocessing the audio input signal, wherein the preprocessing comprises a digital-to-analog conversion processing, an audio signal format conversion processing, a codec processing, an upsampling processing, and a downsampling processing for the audio input signal.

5. The method of claim 1, wherein the digital signal processing is a linear processing or a non-linear processing.

6. The method of claim 5, wherein the digital signal processing comprises a phase processing, an amplitude processing, and a delay processing for the audio data.

7. The method of claim 6, wherein the digital signal processing further comprises a recursive filter, a non-recursive filter, and a non-linear filter applied to the audio data.

8. The method of claim 1, wherein the audio output signal has the same frequency components as the audio input signal.

9. A system of audio signal processing for in-vehicle virtual multichannel sound, comprising:

an input processing module, configured to obtain an audio input signal in a single audio channel, identify different frequency components in the audio input signal, and assign audio data in different frequency bands of the audio input signal to different signal paths according to the different frequency components;

a digital signal processing module, configured to perform digital signal processing on the audio data from different signal paths corresponding to different frequency bands to obtain a plurality of single-channel signals in different frequency bands;

an output processing module, configured to combine the plurality of single-channel signals into a single-channel audio output signal and outputting the single-channel audio output signal; and a power management module, configured to supply power to the input processing module, the digital signal processing module, and the output processing module.

10. An electronic device, comprising:

a memory;

a processor; and a computing program stored on the memory and runnable on the processor, wherein the processor executes the computing program to implement steps in the method of audio signal processing for in-vehicle virtual multichannel sound of claim 1.

* * * * *